US 6,572,046 B2
Jun. 3, 2003

(54) METHOD FOR UNLOCKING A SINGLE REEL TAPE CARTRIDGE LOCKING MECHANISM IN A TAPE CARTRIDGE LOAD OPERATION

(75) Inventor: Robert A. Brummet, Westminster, CO (US)

(73) Assignee: Benchmark Storage Innovations, Boulder, CO (US)

( * ) Notice: Subject to any disclaimer, the term of this patent is extended or adjusted under 35 U.S.C. 154(b) by 49 days.

(21) Appl. No.: 09/925,710

(22) Filed: Aug. 9, 2001

(65) Prior Publication Data

US 2003/0029951 A1 Feb. 13, 2003

(51) Int. Cl.$^7$ .............................................. G11B 23/04
(52) U.S. Cl. ...................................... 242/338.1; 360/93
(58) Field of Search .......................... 242/338.1, 338.3; 360/95, 93

Primary Examiner—John Q. Nguyen

(57) ABSTRACT

The present method for unlocking a single reel tape cartridge locking mechanism in a tape cartridge load operation aids the release of the tape cartridge locking mechanism by manipulating the supply reel motor which is engaged to the single reel tape cartridge in a manner that causes the stuck tape cartridge locking mechanism to release. In order to aid the release of the tape cartridge locking mechanism during the tape cartridge loading procedure, the supply reel motor is operated cyclically to cause the supply reel to vibrate. This vibration is held for a predetermined period of time. At the end of the vibration cycle, the tape drive attempts to pull the tape cartridge leader out of the tape cartridge. If the tape drive again detects that the tape cartridge locking mechanism is not released, it repeats the vibration sequence. The drive can execute a predetermined number of attempts to release the tape cartridge locking mechanism in this manner. If this process is not successful, then the tape drive logs a failure and rejects the tape cartridge by ejecting the tape cartridge from the tape drive.

14 Claims, 4 Drawing Sheets

METHOD FOR UNLOCKING A SINGLE REEL TAPE CARTRIDGE LOCKING MECHANISM IN A TAPE CARTRIDGE LOAD OPERATION

FIELD OF THE INVENTION

The invention relates to digital tape drive data storage devices, and in particular, to a method and apparatus for unlocking the tape cartridge locking mechanism in a single reel tape cartridge when the tape cartridge is loaded into the tape drive.

PROBLEM

It is a problem in industry standard DLT tape cartridges that the tape cartridge locking mechanism can fail to unlock during the tape cartridge loading sequence in a DLT tape drive. This failure results in the inability of the tape drive to pull the magnetic tape out of the tape cartridge and into the tape path.

Digital data is stored on magnetic tape media by tape drives utilizing a variety of designs, but in all cases, magnetic tape media is wound between a pair of tape reels as data is transferred to or from the magnetic tape media. In the art of data storage, the physical space required to store data is an important concern. To conserve space, tape drives often use a single reel tape cartridge design, which utilizes a supply reel located within a removable tape cartridge and a take-up reel located within the tape drive.

After the tape cartridge is inserted into the tape drive, the magnetic tape media must be loaded into the tape drive. The loading operation includes connecting the magnetic tape media to the take-up reel and winding the magnetic tape media to a start point or read position. Various methods have been employed to make this connection. FIG. 1 illustrates one such method wherein the magnetic tape media connects to the take-up reel via a buckle 100 between a tape cartridge leader 103 and a take-up leader 101. The tape cartridge leader 103 terminates the magnetic tape media at one end and is a strong flexible plastic strip that includes an ovular aperture 102 configured to mate with the take-up leader 101. The take-up leader 101 is a similar strong flexible plastic strip attached at one end to the take-up reel. The opposing end includes a stem 104 and a tab 105 designed to buckle with the ovular aperture 102 on the tape cartridge leader 103. During the buckling operation, a rotating catch connected to a load motor cooperates with a positioning lever to position the take-up leader 101 and the tape cartridge leader 103 for buckling. After the take-up leader 101 and the tape cartridge leader 103 are buckled, the catch is rotated out of the way to a loaded position and the buckle 100 is wound through a tape path until the magnetic tape media is in a read position relative to the tape head. Similarly, an unloading operation includes unwinding the take-up leader 101 and tape cartridge leader 103 back past the tape head, rotating the catch back to the unloaded position to disconnect the take-up leader 101 and the tape cartridge leader 103, and ejecting the tape cartridge from the tape drive.

Unfortunately, failures that cause the tape drive to malfunction can occur during the tape cartridge loading operation. One form of failure, referred to as a locking mechanism failure, occurs when the tape cartridge locking mechanism located within the tape cartridge does not completely rotate back to the unlocked position upon loading of the tape cartridge. When this occurs, the tape cartridge locking mechanism does not disconnect from the locking features on the tape reel, causing the tape reel to become stuck in the tape cartridge when rotation of the tape reel is attempted. Following a locking mechanism failure, the tape drive must eject the tape cartridge out of the tape drive.

Unfortunately, this problem is not easily solved since the operation of the tape cartridge locking mechanism, which retains the magnetic tape media in the tape cartridge is mechanically tied to a single unlock mechanism in the tape drive. During operation, the unlock mechanism attempts to release the tape cartridge locking mechanism and allow the tape reel to rotate and initiate the tape buckling operation described above. If the tape cartridge locking mechanism is stuck due to reverse rotation of the tape reel, the unlock mechanism in the tape drive is incapable of overcoming the force exerted on the tape cartridge locking mechanism by the tape reel.

SOLUTION

The above described problems are solved and a technical advance achieved by the present method for unlocking a single reel tape cartridge locking mechanism in a tape cartridge load operation, which aid the release of the tape cartridge locking mechanism by manipulating the supply reel motor which is engaged to the single reel tape cartridge in a manner that causes the stuck tape cartridge locking mechanism to release. In order to aid the release of the tape cartridge locking mechanism during the tape cartridge loading procedure, the supply reel motor is operated cyclically to cause the supply reel to vibrate. This vibration is held for a predetermined period of time. At the end of the vibration cycle, the tape drive attempts to pull the tape cartridge leader out of the tape cartridge. If the tape drive again detects that the tape cartridge locking mechanism is not released, it repeats the vibration sequence. The tape drive can execute a predetermined number of attempts to release the tape cartridge locking mechanism in this manner. If this process is not successful, then the tape drive logs a failure and rejects the tape cartridge by ejecting the tape cartridge from the tape drive.

DETAILED DESCRIPTION OF THE DRAWINGS

Figure 1:
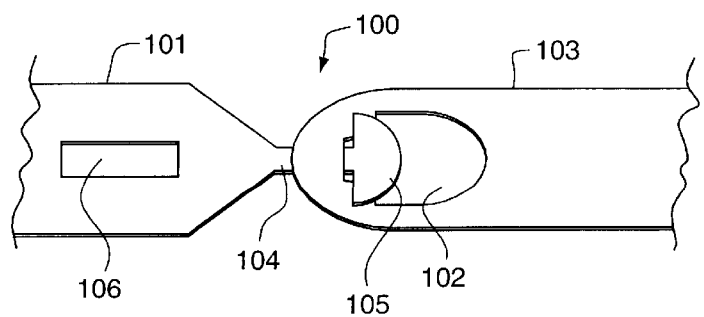
FIG. 1 illustrates an example of a buckle connection used in tape drive systems that load a single reel tape cartridge.
Figure 2:
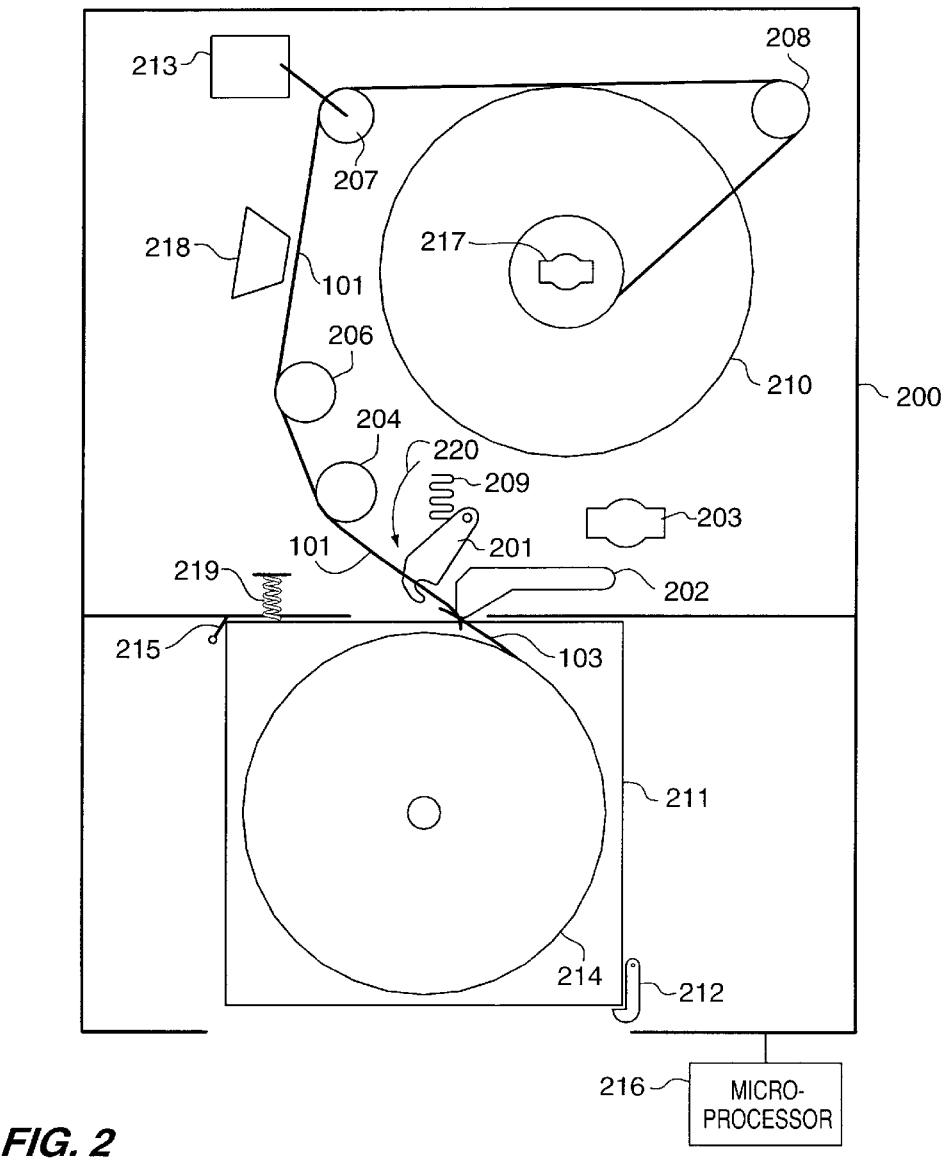
FIG. 2 illustrates an example of a tape drive configured with present method for unlocking a single reel tape cartridge locking mechanism in a tape cartridge load operation.
Figure 3:
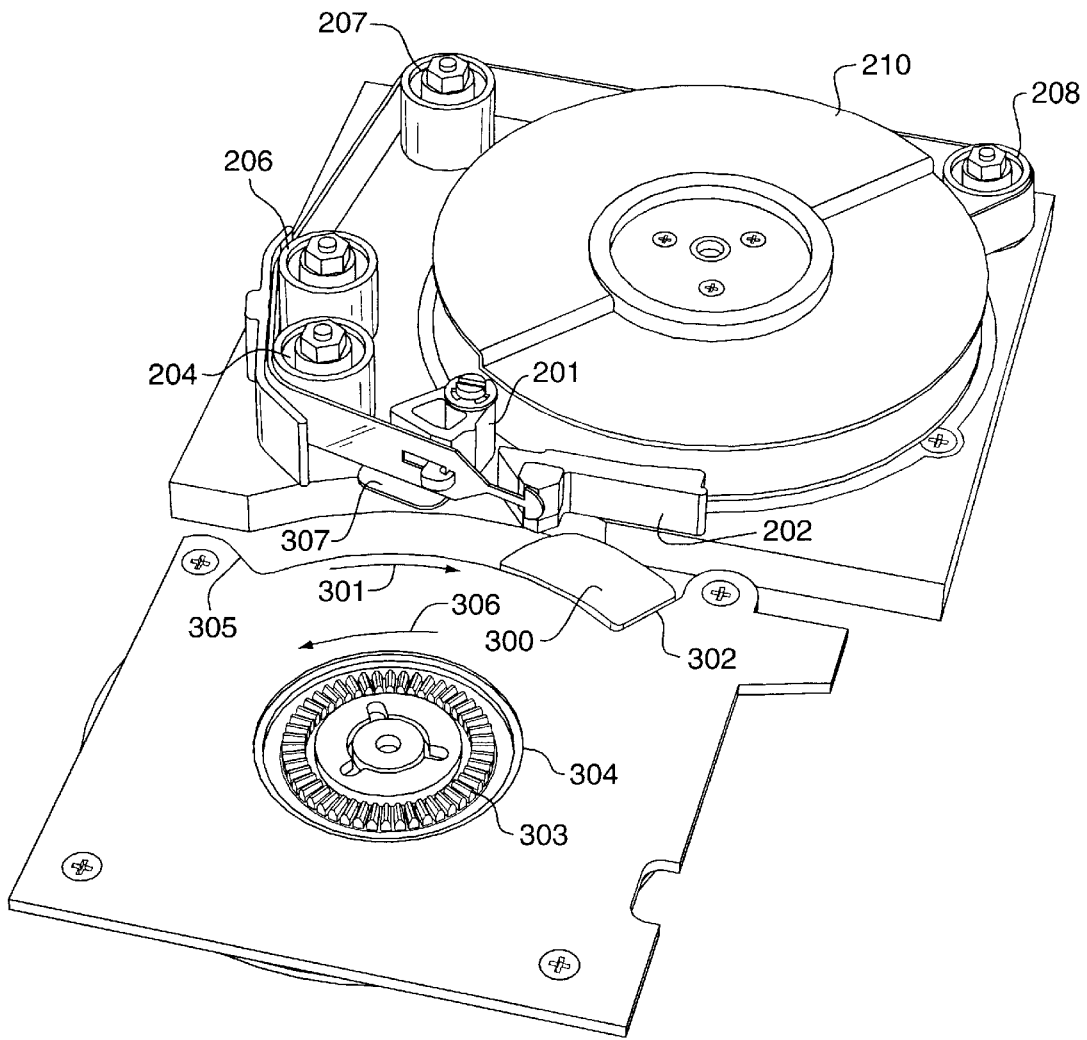
FIG. 3 illustrates an example of a typical tape drive loading mechanism.

FIG. 2 illustrates an example of a tape drive configured with present method for unlocking a single reel tape cartridge locking mechanism in a tape cartridge load operation and FIG. 3 illustrates an example of a typical tape drive loading mechanism. In the following description of a prior art loading operation, the tape cartridge loading operation begins when the tape cartridge 211 is inserted into tape drive 200. The tape cartridge 211 houses magnetic tape media wound around a supply reel 214. The tape cartridge leader 103 terminates the magnetic tape media at one end and operates to connect the magnetic tape media to the take-up leader 101. The take-up leader 101 connects to the take-up reel 210 and winds around guide rollers 204, 206, 207, and 208 where it connects to the tape cartridge leader 103.

When the tape cartridge 211 is fully inserted into the tape drive 200, the tape cartridge leader 103 is positioned to buckle with the take-up leader 101 by the positioning lever 202. The loading of the tape cartridge 211 activates the cartridge present switch 215. The microprocessor 216, in response to a signal from the cartridge present switch 215, initiates the connection of the take-up leader 101 and the tape cartridge leader 103 by energizing a take-up motor 217 to bias the take-up leader 101 firmly on the catch 201. The microprocessor 216 then energizes a load motor 203 to rotate the cam 300 in the direction 306 from the position 302 to the position 305. During the rotation the cam 300 engages the plate 307 on the bottom of the catch 201 to rotate the catch 201 to a loaded position where the catch 201 drops out of the aperture 106. The microprocessor 216 then energizes the take-up motor 217 to wind the take-up leader 101 around the take-up reel 210 until the tape media is in a read position relative to the tape head 218. In the loaded position, the catch 201 is held compressed against a spring 209 by the cam 300 of FIG. 3.

Figure 4:
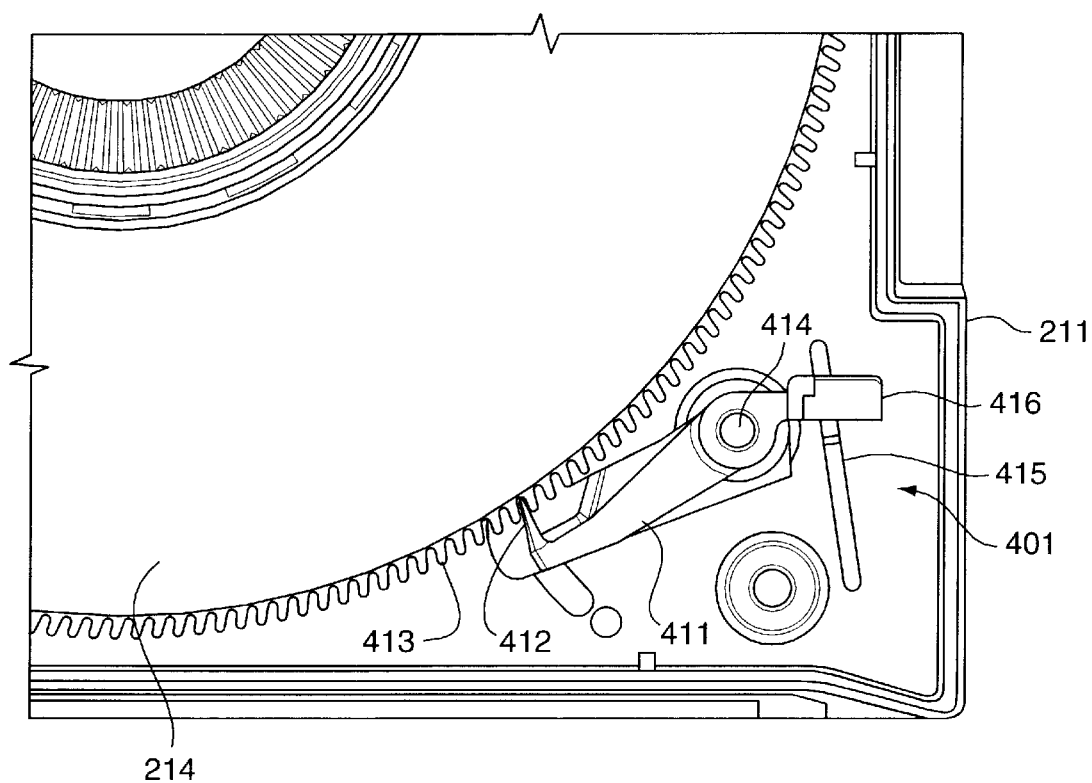
FIG. 4 illustrates a top plan view of the tape cartridge locking mechanism used in a typical single reel tape cartridge.

FIG. 4 illustrates a top plan view of the tape cartridge locking mechanism used in a typical single reel tape cartridge. The typical single reel magnetic tape cartridge 211 as described above includes a supply reel 214 on which the magnetic tape media is wound. To execute the buckling operation described above, the supply reel 214 must be free to rotate so the buckling mechanism can be operational. The single reel tape cartridge 211 typically includes a tape cartridge locking mechanism 401 to prevent the rotation of the supply reel 214 when the tape cartridge 211 is not loaded in the tape drive. This prevents the magnetic tape media from unwinding from the supply reel 214 during handling. The tape cartridge locking mechanism 401 consists of a pivotally operable lever 411 that has formed on one end thereof a feature 412 that engages corresponding features 413 on the supply reel 214. In the example shown in FIG. 4, the lever 411 pivots about pivot point 414 to enable "pin" 412 to seat in a one of the "teeth" 413 that are formed on the periphery of the circumference of the supply reel 214. It is obvious that other mating features can be used to accomplish this locking function and the pin and teeth implementation is illustrative of such a mechanism.

Figure 5:
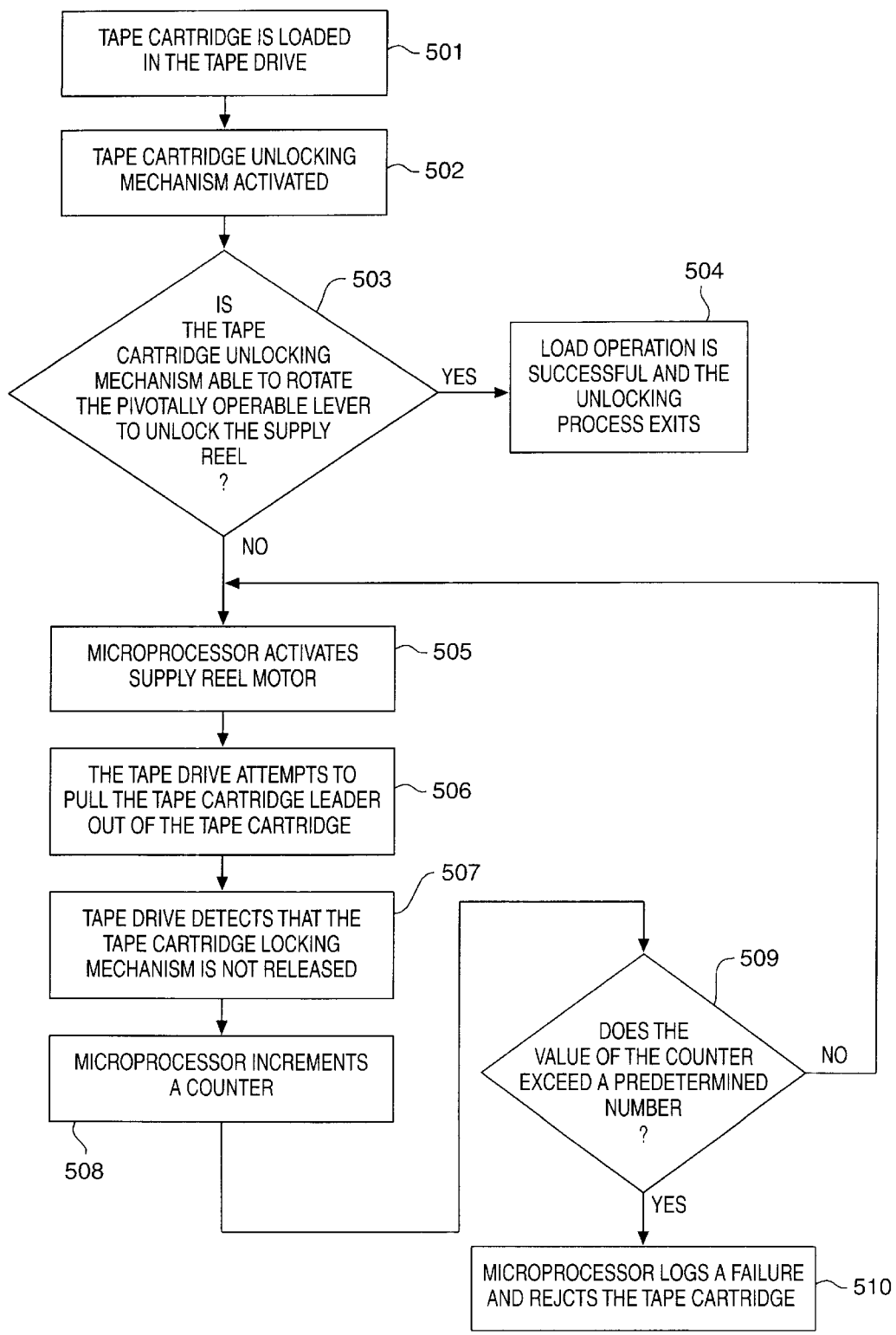
FIG. 5 is a flow chart illustrating an example of the operational steps used in executing the present method for unlocking a single reel tape cartridge locking mechanism in a tape cartridge load operation.

FIG. 5 is a flow chart illustrating an example of the operational steps used in executing the present method for unlocking a single reel tape cartridge locking mechanism in a tape cartridge load operation. Thus, when the tape cartridge is loaded in the tape drive at step 501 as described above, a tape cartridge unlocking mechanism 415 located in the tape drive is activated by microprocessor 216 at step 502. If the tape cartridge unlocking mechanism 415 engages an end 416 of the tape cartridge locking mechanism 401 and is able to rotate the pivotally operable lever 411 in the tape cartridge 211 at step 503, the supply reel 214 is unlocked and the load operation is successful and the unlocking process exits at step 504.

If the If the tape cartridge unlocking mechanism 415 engages an end 416 of the tape cartridge locking mechanism 401 and is not able to rotate the pivotally operable lever 411 in the tape cartridge 211 at step 503, then processing advances to step 505 where the microprocessor 216 activates the supply reel motor, which is engaged to the single reel tape cartridge, in a manner that causes the stuck tape cartridge locking mechanism 401 to release. In order to aid the release of the tape cartridge locking mechanism 401 during the tape cartridge loading procedure, the supply reel motor is operated cyclically to cause the supply reel 214 to vibrate while the tape cartridge unlocking mechanism 415 remains activated. This vibration is held for a predetermined period of time. At the end of the vibration cycle, the tape drive at step 506 attempts to pull the tape cartridge leader out of the tape cartridge 211. If the tape drive again detects at step 507 that the tape cartridge locking mechanism 401 is not released, microprocessor 216 increments a counter at step 508, returns to step 505 and repeats the vibration sequence. The tape drive can execute a predetermined number of attempts to release the tape cartridge locking mechanism 401 in this manner. If this process is not successful, as determined at step 509 by the counter value exceeding a predetermined number, then the microprocessor 216 of the tape drive logs a failure and rejects the tape cartridge 211 by ejecting the tape cartridge 211 from the tape drive at step 510.

An example of a typical vibration that is effective to release the tape cartridge locking mechanism is a frequency of approximately 12.5 Hz and a magnitude of 9 oz-in of torque. This vibration is held for a predetermined period of time, such as 2.8 seconds to provide sufficient impetus to release the locking pin 412 from the tooth 413 in which it is engaged. The exact values are a function of the implementation of the tape cartridge locking mechanism used in the tape cartridge and can vary widely from the examples noted above.

Those skilled in the art will appreciate numerous variations in sensing configuration and operation that are within the scope of the present method for unlocking a single reel tape cartridge locking mechanism in a tape cartridge load operation.

What is claimed is:

1. A method for unlocking a supply reel in a single reel tape cartridge that is loadable into a tape drive, the method comprising the steps of:

activating a tape cartridge unlocking mechanism in the tape drive to disengage a tape cartridge locking mechanism located in said single reel tape cartridge from a supply reel located in said single reel tape cartridge;

driving, in response to a failure of said tape cartridge unlocking mechanism in the tape drive to disengage said tape cartridge locking mechanism, a supply reel motor in said tape drive to vibrate said supply reel; and reactivating said tape cartridge unlocking mechanism in said tape drive to disengage said tape cartridge locking mechanism located in said single reel tape cartridge from a supply reel located in said single reel tape cartridge.

2. The method of claim 1, further comprising the steps of:

repeating said steps of activating and driving, which steps constitute an attempt to disengage said tape cartridge locking mechanism; and maintaining a count of a number of attempts to disengage said tape cartridge locking mechanism.

3. The method of claim 2 further comprising the step of:

terminating said steps of activating and driving in response to said count exceeding a predetermined value.

4. The method of claim 1, wherein the step of driving comprises:

activating said supply reel motor at a predetermined frequency and a predetermined magnitude.

5. The method of claim 4 wherein the step driving further comprises:

maintaining activation of said supply reel motor for a predetermined period of time.

6. The method of claim 1, wherein the step of driving comprises:

activating said supply reel motor at a frequency of approximately 12.5 Hz and a magnitude of 9 oz-in of torque.

7. The method of claim 6 wherein the step driving further comprises:

maintaining activation of said supply reel motor for a time of approximately 2.8 seconds.

8. A method for unlocking a supply reel in a single reel tape cartridge that is loadable into a tape drive, the method comprising the steps of:

activating a tape cartridge unlocking mechanism in the tape drive to disengage a tape cartridge locking mechanism, located in said single reel tape cartridge, from a supply reel, located in said single reel tape cartridge;

driving, in response to a failure of said tape cartridge unlocking mechanism in the tape drive to disengage said tape cartridge locking mechanism, a supply reel motor in said tape drive to vibrate said supply reel.

9. The method of claim 8, further comprising the steps of:

determining whether said tape cartridge locking mechanism is disengaged from said supply reel;

repeating said steps of activating and driving, which steps constitute an attempt to disengage said tape cartridge locking mechanism in response to failure to disengage said tape cartridge locking mechanism from said supply reel; and maintaining a count of a number of attempts to disengage said tape cartridge locking mechanism.

10. The method of claim 9 further comprising the step of:

terminating said steps of activating and driving in response to said count exceeding a predetermined value.

11. The method of claim 8, wherein the step of driving comprises:

activating said supply reel motor at a predetermined frequency and a predetermined magnitude.

12. The method of claim 11 wherein the step driving further comprises:

maintaining activation of said supply reel motor for a predetermined period of time.

13. The method of claim 8, wherein the step of driving comprises:

activating said supply reel motor at a frequency of approximately 12.5 Hz and a magnitude of 9 oz-in of torque.

14. The method of claim 13 wherein the step driving further comprises:

maintaining activation of said supply reel motor for a time of approximately 2.8 seconds.

* * * * *